United States Patent [19]
Lee et al.

[11] Patent Number: 5,696,685
[45] Date of Patent: Dec. 9, 1997

[54] CONTROL SYSTEM FOR AN ELECTRONIC POSTAGE METER HAVING A PROGRAMMABLE PRINT HEAD CONTROLLER

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 271,317

[22] Filed: Jul. 6, 1994

[51] Int. Cl.$^6$ .............. G07B 17/00; G06F 9/06
[52] U.S. Cl. .............. 364/464.18; 101/71; 364/464.2; 395/653
[58] Field of Search .............. 101/71; 364/464.02, 364/464.11, 464.18, 464.2; 395/775, 653

[56] References Cited

U.S. PATENT DOCUMENTS

| | | | |
|---|---|---|---|
| 4,168,533 | 9/1979 | Schwartz | 364/464.02 |
| 4,589,785 | 5/1986 | Sato | 400/61 |
| 4,816,823 | 3/1989 | Polkinghorne et al. | 340/825.15 |
| 5,097,437 | 3/1992 | Larson | 395/775 |
| 5,243,274 | 9/1993 | Kelsey et al. | 371/22.1 |
| 5,267,172 | 11/1993 | Vermesse | 364/464.02 |
| 5,283,744 | 2/1994 | Abumehdi et al. | 364/464.02 |
| 5,347,617 | 9/1994 | Webb et al. | 395/108 |
| 5,355,152 | 10/1994 | Porter et al. | 347/214 |
| 5,481,742 | 1/1996 | Worley et al. | 395/109 X |
| 5,483,458 | 1/1996 | Lee et al. | 364/464.02 |

Primary Examiner—Edward R. Cosimano
Attorney, Agent, or Firm—Angelo N. Chaclas; Charles G. Parks, Jr.; Melvin J. Scolnick

[57] ABSTRACT

The printer control module is programmed to output control signals to the printer driver characterized by the data written in the control registers. The control system for a printing apparatus includes a printer unit responsive to a printer driver unit. The printer driver unit is responsive to the control system. The control system has a programmable printer control module in communication with the printer driver unit and a programmable microcomputer in bus communication with the printer control module. The microcomputer has a non-volatile memory unit for storing the data. The printer driver unit is responsive to control signals from the printer control module for driving the printer unit. The printer control module includes a buffer for holding printer data and the registers of the control module, including a control register, a shift register and a strobe width register. A strobe signal module generates a strobe signal for the printer driver unit having one of a plurality of strobe widths selected in response to the data written in the strobe width register. The control module also selectively causes one of a plurality of clock signals for the printer driver unit in response to data written in the control register. A shift module causes printer data to be delivered to the printer driver unit in one of a plurality of frame sizes in response to data written in the shift register. The programmable microcomputer is programmed to writing data into the control registers.

2 Claims, 4 Drawing Sheets

CONTROL SYSTEM FOR AN ELECTRONIC POSTAGE METER HAVING A PROGRAMMABLE PRINT HEAD CONTROLLER

BACKGROUND OF THE INVENTION

The present invention relates to electronic postage metering systems, and like systems, having digital printing system.

There are several types of digital printing techniques, for example, ink jet and thermal ink transfer, potentially suitable for application in electronic postage meter printing systems. Generally, both ink jet and thermal ink transfer involve employing a print head driver circuit under the control of a microprocessor control system and a print head responsive to the driver circuit.

In electronic postage meter, it is known to develop a unique control system for each meter model, i.e., each meter module has a control system incorporating a different microprocessor, different ASIC, different memory devices and a variety of other electrical components. The most conventional printing techniques used by electronic postage meters for postage indicia printing is letter press employing either rotary drum or flat bed printing techniques. Because of the unique security requirements of an electronic postage meter, it is customary for the meter manufacturer to manufacture their own unique printing systems. As a result, the control systems for each meter model series is relatively standard.

One of the concerns in applying alternative printing techniques to the postage meter environment, is that unlike the conventional printing techniques employed in electronic postage meters, there can be substantial variation in the print quality between like print heads, even among those in the same manufactured process batch. In non-metering applications, the variation in print quality is not a critical system consideration. However, in postage metering application, it is required that the print quality of the postage indicia, as evidence of funds transfer, be maintained relatively consistent between meters and over large number of print cycles. The problem of obtaining predictable print quality is further complicated in regards to digital printing in that the print heads are supplied by a variety of sources.

SUMMARY OF THE INVENTION

It is an objective of the present invention to present an electronic postage meter microprocessor control system suitable for controlling the operation of a variety of printing systems wherein the microprocessor control system may be easily programmed to control any one of a variety of print heads or printing types.

It is a further objective of the present invention to present an electronic postage meter microprocessor control system suitable for controlling the operation of a variety of printing systems wherein the microprocessor control system may be easily programmed to control any one of a variety of print technologies, e.g., thermal printing, impact printing, ink jet or laser, to produce uniform print quality wherein the microprocessor control system includes an ASIC having a programmable printer module for transmitting control parameters to the print driver system.

The control system for an EPM is comprised of a programmable microprocessor in bus communication with a plurality of non-volatile memory units for accounting for the postage printed by a printing unit responsive to the programming of the microprocessor. The programmable microprocessor is also in bus communication with a ROM or program memory, a random access memory (RAM), and an application specific integrated circuit (ASIC). The ASIC is comprised of a number of system modules, i.e., microprocessor interface module, address decoder module, interrupt controller module, clock module, timer module, non-volatile memory security module, printer module, communication module, print head controller mule, graphical interface module and CCD interface module.

The ASIC also includes a plurality of addressable registers which, upon system power-up, are accessed by the microprocessor and into which the various operating parameters for each module are written including the operating parameters of the printer module. The programmability of the ASIC in this manner allows the ASIC to be customized under software control for the particular postage metering system.

The print module is comprised of a 32 bit buffer for receiving printer data and a plurality of assigned registers. Information written to the registers sets various control parameters for the print head driver; for example, message size (8 bit, 16 bit or 34 bit) which will be transmitted to the driver in a single message frame, selected clock rate and the selected strobe width of the strobe signal sent to the print driver. It should now be appreciated, that the printer module can be programmed to accommodate a wide variety of printing systems. Further, specific types of digital printing for the specific operating parameters for the print head may be measured, for example, the specific resistance of a given thermal print head and unique control parameters specifically adjusted to optimize performance. For example, with a thermal printing system, the strobe signal may be uniquely defined to assure that the print head delivers the desired print quality.

DETAILED DESCRIPTION OF THE PREFERRED EMBODIMENTS

Figure 1:
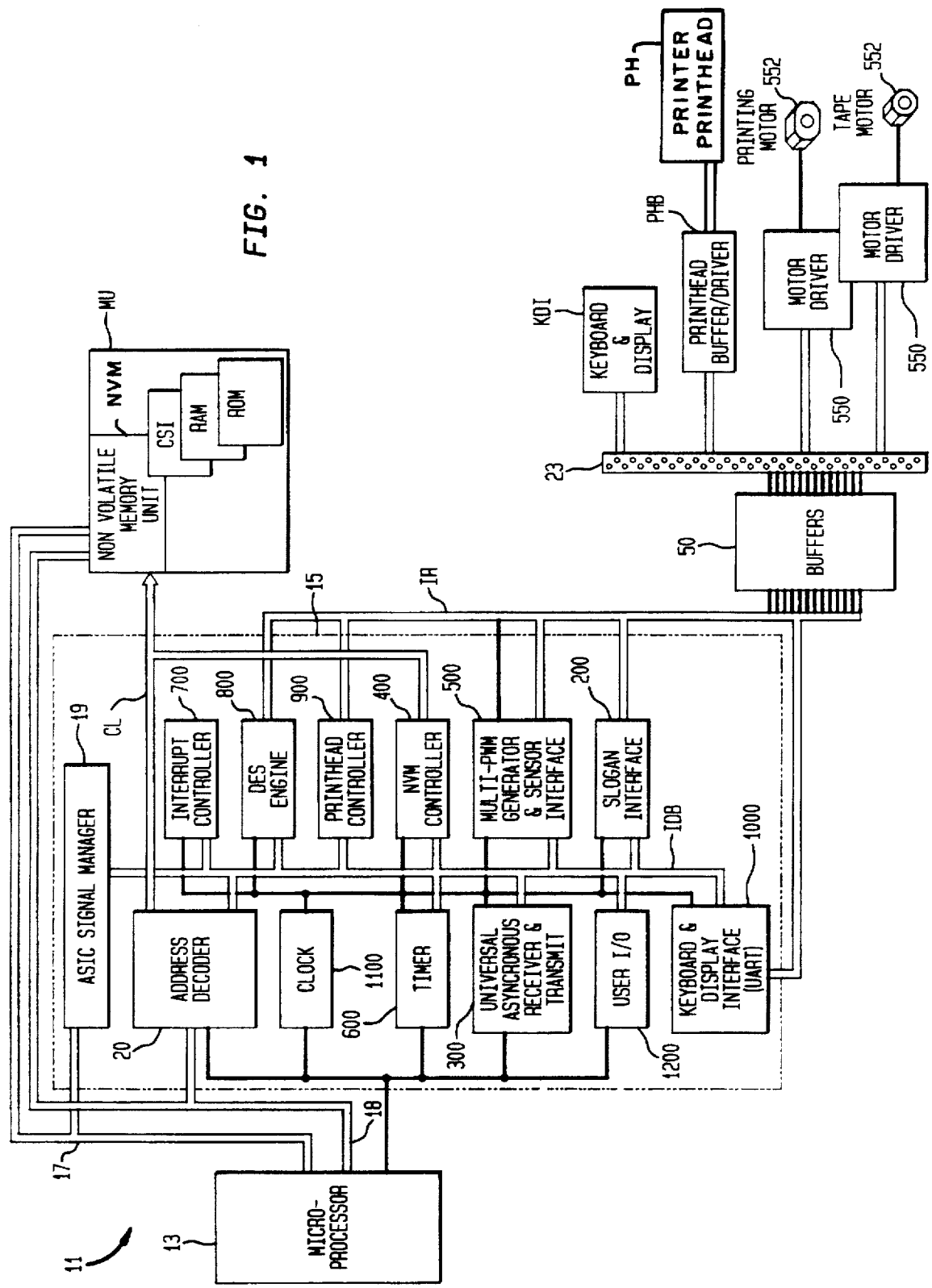
FIG. 1 is a schematic of a microcontroller system for a thermal printing EPM in accordance with the present invention.

Referring to FIG. 1, a microprocessor control system, generally indicated as 11, which is preferably intended to control a thermal printing postage meter (not shown), is comprised of a microprocessor 13 in bus 17 and 18 communication with an application specific integrated circuit (ASIC) 15 and a plurality of memory units generally indicated as MU. The memory units MU includes non-volatile units NVM, Random Access Memory RAM. The ASIC 15 is comprised of a number of integrated circuit modules, for example, ASIC signal manager 19, address decoder 20, clock 1100, timer module 600, UART module 300, user I/O 1200, keyboard and display interface 1000, interrupt controller 700, print head controller module 900, encryption and decryption engine 800, memory controller 400, multi-PWM generator and sensor interface 500 and a slogan interface 200. It should be appreciated that it is within the contemplation of the present invention that the IC modules which make up the ASIC 15 may vary and the modules here identified are intended to illustrate the preferred embodiment of the invention.

The ASIC 15 has an internal data bus (IDB) and a plurality of control lines CL. Certain of the modules are in communication with a buffer 50 via an internal bus (IR). The buffer 50 is in bus communication with a coupler 23. The coupler 23 is in communication with various meter devices, such as, the keyboard display drive KDI, print head buffer/driver PHB and motor drivers 550 which drive respective motors 552. The print head buffer/driver PHB drives a printer unit PH. In FIG. 1, the bus lines IDB and IB, and control lines CL are depicted in simplified manner for the purpose of clarity.

Figure 2:
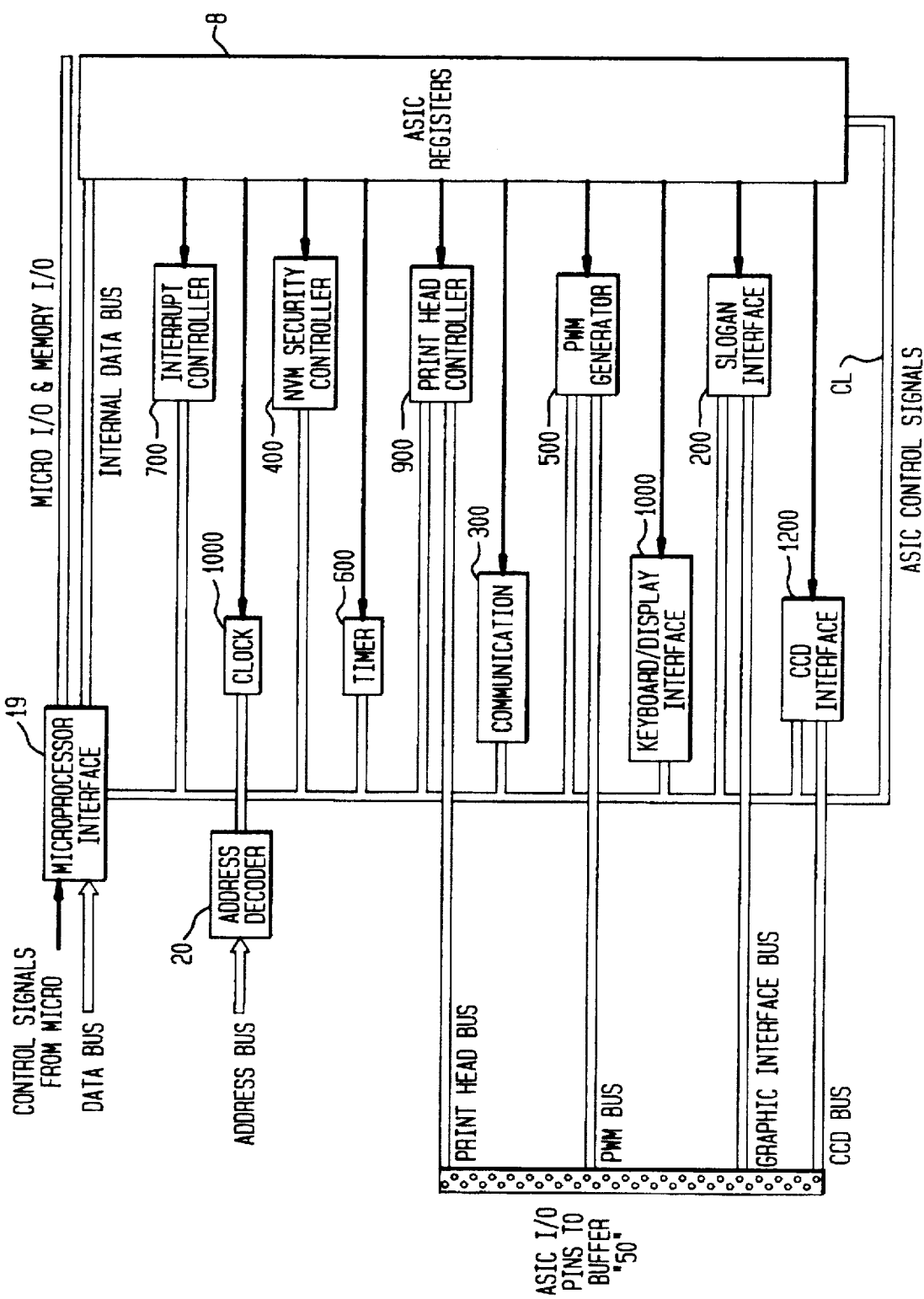
FIG. 2 is a schematic of a programmable ASIC in accordance with the present invention.

Referring to FIGS. 1 and 2, the microprocessor 13, in the preferred embodiment, is a Motorola Module MC68EC000 which passes the control signals and data between the microprocessor 13 and the microprocessor interface circuit 19 and address decoder 20 of the ASIC. The control system address bus is received by the ASIC address decoder 20 which generates the necessary control signal on internal ASIC control bus CL for enabling the respective modules in accordance with the address instruction from the microprocessor 13. Low order data from the system data bus 17 is received by the interface 19 and placed on the internal data bus to be placed in the ASIC registers 8 when enabled by the address decoder 20 in response to address instructions from the microprocessor. The data placed in the ASIC registers 8 represents the operating parameters for the respective modules which is accessed by the respective modules during when the respective modules have been enabled by the address decoder 20. A more complete description of the microprocessor control system is presented in U.S. patent application Ser. No. 08/163,629, issued on Sep. 3, 1996 as U.S. Pat. No. 5,552,991, entitled "Control System For An Electronic Postage Meter Having A Programmable Application Specific Integrated Circuit", filed Dec. 9, 1993, commonly assigned and herein incorporated by reference.

Figure 3:
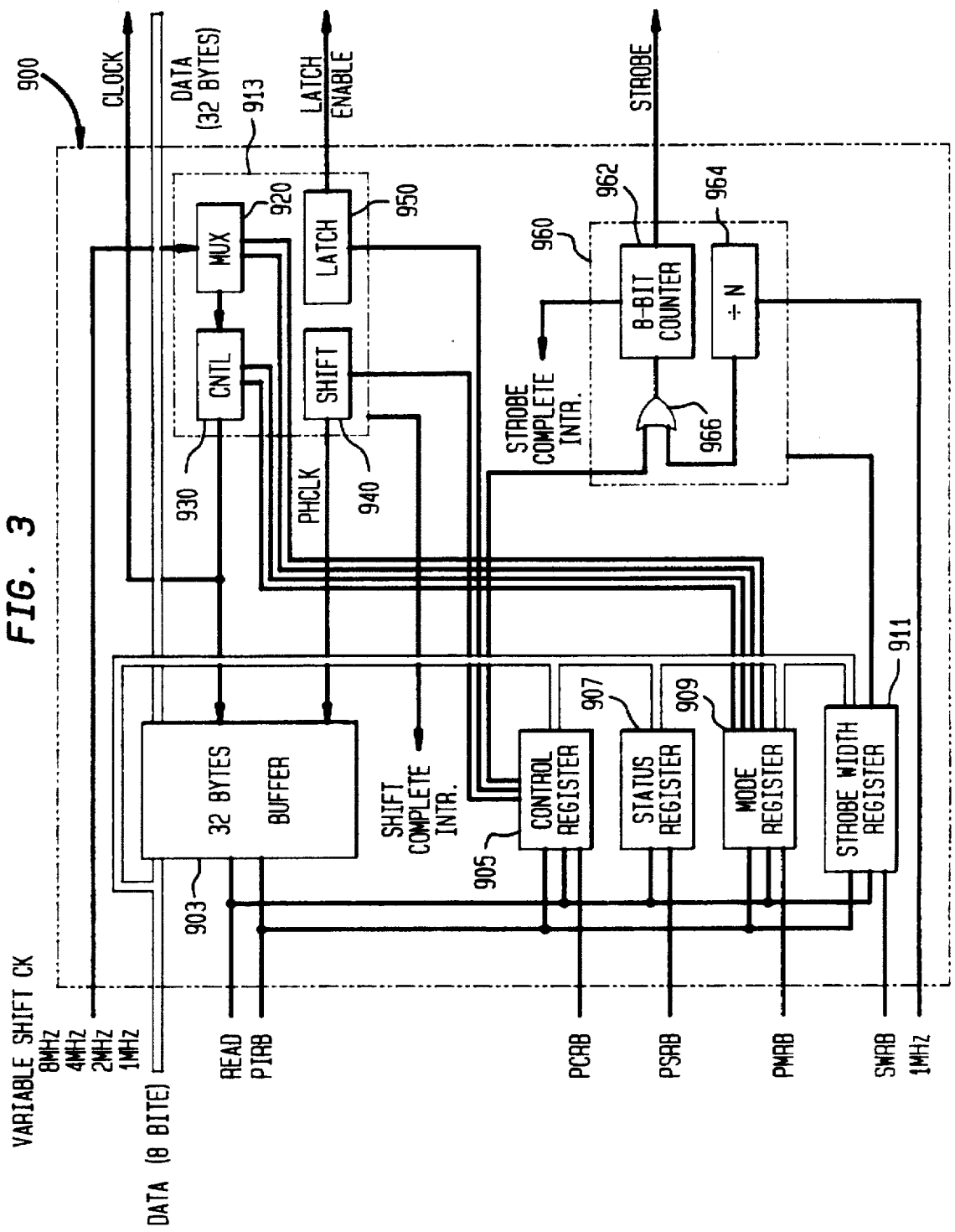
FIG. 3 is a schematic of a ASIC print head controller module in accordance with the present invention.
Figure 4:
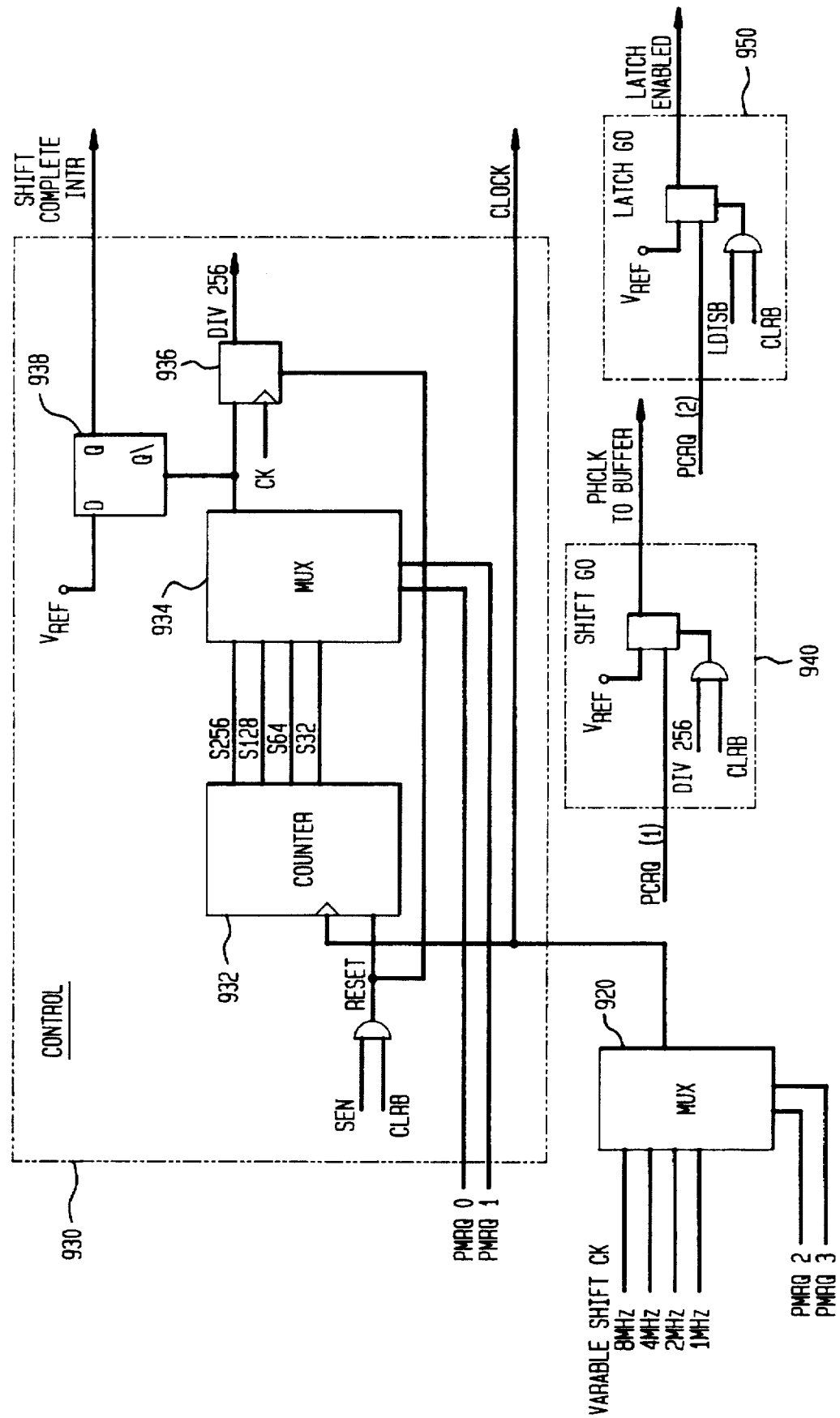
FIG. 4 is a discrete logic schematic of the control sub modules of the print head controller module in accordance with the present invention.

Referring to FIGS. 3 and 4, the print head control module 900 includes a buffer 903, which in the preferred embodiment is 32 bytes buffer, a shift control section 913, a strobe control section 960 and a plurality of registers. The registers are the control register 905, status register 907, mode register 909 and strobe width register 911. The strobe control section 960 is of any suitable conventional configuration and includes a 8-bit counter 962 and an N-divider 964. The control section 913 is comprised of a control section 930, multiplex section 920, shift section 940 and latch section 950.

Referring also to FIG. 4, in operation, the print controller 900 is provided with one of four shift clock values, e.g., 8 MHz, 4 MHz, 2 MHz, 1 MHz from the timer module 600. The timer module 600 of any suitable configuration which receives a signal clock and suitably divides that signal to produce the desired shift clock values as an output. The shift clock values are directed to the multiplexer 920 which depend on the state of data bites PMRQ2 and PMRQ3 stored in the mode register 909. The selected output from the multiplexer 920 represents the system clock signal CLOCK. The system clock signal CLOCK is directed to the print head buffer/driver PHB and to the clock input of a counter 932 which is part of the control section 930. The output from the counter 932, which represents the message bit count length of 256 bytes, 128 bytes, 64 bytes and 32 bytes, is directed to the input side of a multiplexer 934. The selection of the appropriate message byte length of the particular print head buffer/driver PHB is determined by the multiplexer 934 and depends on the data bit PMRQ0 and PMRQ1 of the mode register 909. The output of the multiplexer 934 is directed to the input of a flip-flop 936 and the rest to the input of a flip-flop 938. It should now be appreciated that the output of the flip-flop 938 goes active when a data shift is completed to produce a shift complete interrupt which is directed to the interrupt controller 700 which informs the microprocessor to indicate a complete data transfer. A detailed description of a preferred interrupt controller system is described in U.S. patent application Ser. No. 08/163,810, filed Dec. 9, 1993, commonly assigned and herein incorporated by reference.

In order to enable data transfer, the output PHCLK from the shift section 940 is driven active in response to the data bit PCRQ(1) in the control register and, in like manner, the latch enable signal from the control register 905 is driven active in response to the data bit PCRQ(2).

Referring more particularly to FIGS. 2 and 3, during system start-up, the microprocessor 13 addresses the address decoder 20 to enable the writing of data to the ASIC registers 8. In particular, data is written to the control register 905, status register 907, mode register 909 and strobe width register 911. To initiate a write cycle, the microprocessor properly addresses the address decoder 20 which outputs a control signal PIRB which enables writing of data to the buffer 903. In the preferred embodiment, this data represents the necessary data print head driver to cause printing of a postage indicia by a suitable digital printer. Printing is commenced by the microprocessor 13 enabling printing data to be written to the buffer 903 and then addressing the address decoder to enabling control lines PCRB, PMRB and SWRB.

As previously noted, the multiplexer 920 responds to provide the selected shift clock signal to the controller section 930 which then provides the appropriate clock signal to the buffer 930 for data transfer to the print head buffer/driver PHB. The output from the control register 905 is directed to the shift section 940 to initiate the actual data transfer from the buffer 903 and to the latch section 950 to latch enable the buffer/driver PHB in a conventional manner. The data bit stored in a strobe width register determines the value of the N-divider 964 through which a 1 MHz signal is directed. The output signal is directed to a 8-bit counter 960 through an OR gate 966. Also, directed to the OR gate 966 is a control signal from the control register which enables the OR gate 966. The strobe signal output from the strobe section 960 is directed to buffer/driver PHB. As previously noted, when the data from the buffer 903 has been transferred, the flip-flop 938 of the control section 960 (refer to FIG. 4) issues a shift complete interrupt signal to the microprocessor.

It should now be appreciated that the above printer controller 900 has an architecture which will allow the printer controller to control both contact printer and non-contact printers such as ink jet, laser and thermal transfer. The printer controller 900 is suited to provide the printer drivers with the necessary print data in a compatible byte size. As a result, an ASIC using a printer controller as described has suitable versatility to be employed with a variety of printing technologies.

The above description represents the preferred embodiment and should not be viewed as limiting. The scope of the invention is presented in the appendix claims.

What is claimed is:

1. A control system for a postage meter capable of driving any one of a plurality of different types of printers, the control system comprising:

a printer control module including memory and in communication with a printer unit, the printer control module providing control signals for driving the printer unit; and a microcomputer in communication with the printer control module for automatically writing data into the memory of the printer control module upon each power-up of the postage meter and prior to any printing taking place; and wherein the data includes parameters which configure the printer control module to produce control signals for the printer unit corresponding to a select one of the plurality of different types of printers.

2. A control system for a postage meter capable of driving any one of a plurality of different types of printers as described in claim 1, wherein:

the data includes a parameter indicative of a message frame size necessary for proper communication with the one of a plurality of different types of printers.

* * * * *